United States Patent [19]

Hays

[11] Patent Number: 5,655,637

[45] Date of Patent: Aug. 12, 1997

[54] AUTOMOTIVE CLUTCH WITH IMPROVED HEAT SHIELD

[76] Inventor: Bill J. Hays, Rte. One Box 1040, Bandon, Oreg. 97411

[21] Appl. No.: 574,028

[22] Filed: Dec. 18, 1995

[51] Int. Cl.$^6$ ............................................. F16D 13/70
[52] U.S. Cl. ........................ 192/70.14; 192/113.4; 192/107 M; 188/264 A
[58] Field of Search ..................... 192/70.14, 70.12, 192/107 M, 113.21, 113.22, 113.4; 188/264 A

[56] References Cited

U.S. PATENT DOCUMENTS

| | | | |
|---|---|---|---|
| 1,865,327 | 6/1932 | McCain et al. | 192/107 M |
| 2,190,874 | 2/1940 | Jarrett | 192/113.4 |
| 3,732,953 | 5/1973 | Huet | 192/107 M X |
| 4,858,731 | 8/1989 | Bush | 192/107 M X |
| 5,083,650 | 1/1992 | Seiz et al. | 192/107 M |
| 5,161,654 | 11/1992 | Valentin | 192/107 M X |

FOREIGN PATENT DOCUMENTS

| | | | |
|---|---|---|---|
| 60-53224 | 3/1985 | Japan | 192/113.4 |

Primary Examiner—Andrea L. Pitts
Attorney, Agent, or Firm—Plante & Strauss

[57] ABSTRACT

There is disclosed an improved automotive clutch having a pressure ring, preferably formed of aluminum, with a heat shield that includes a thin outer metallic ring, preferably of steel, which is laminated to a layer of an adhesive resin that contains metallic elements which are in substantially direct heat exchange between the outer steel ring and the aluminum pressure ring. For this purpose, copper screen of suitable mesh, from 10 to about 20 U.S. Standard, is embedded in the adhesive resin layer, reinforcing the adhesive layer and providing a controlled degree of direct heat transmission from the steel ring to the aluminum ring. In preferred embodiments, the attachment of the steel ring to the pressure ring is enhanced by a plurality of countersunk, flush head fasteners which are spaced about the periphery of the ring in a regular geometric array. Optionally, a plurality of slots are provided in the steel ring to compensate for the differences in thermal expansion of the steel ring and the aluminum pressure ring.

24 Claims, 3 Drawing Sheets

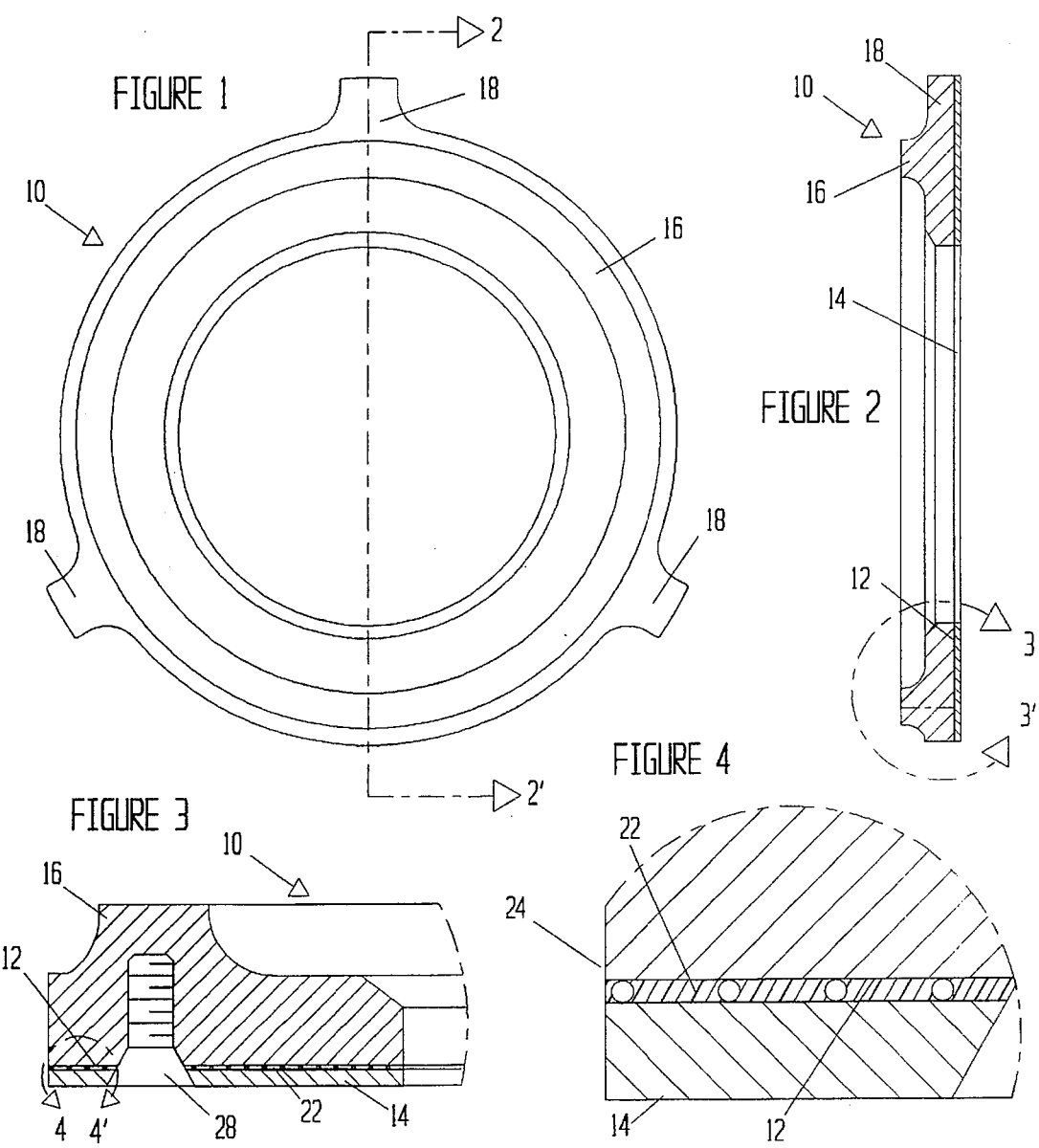

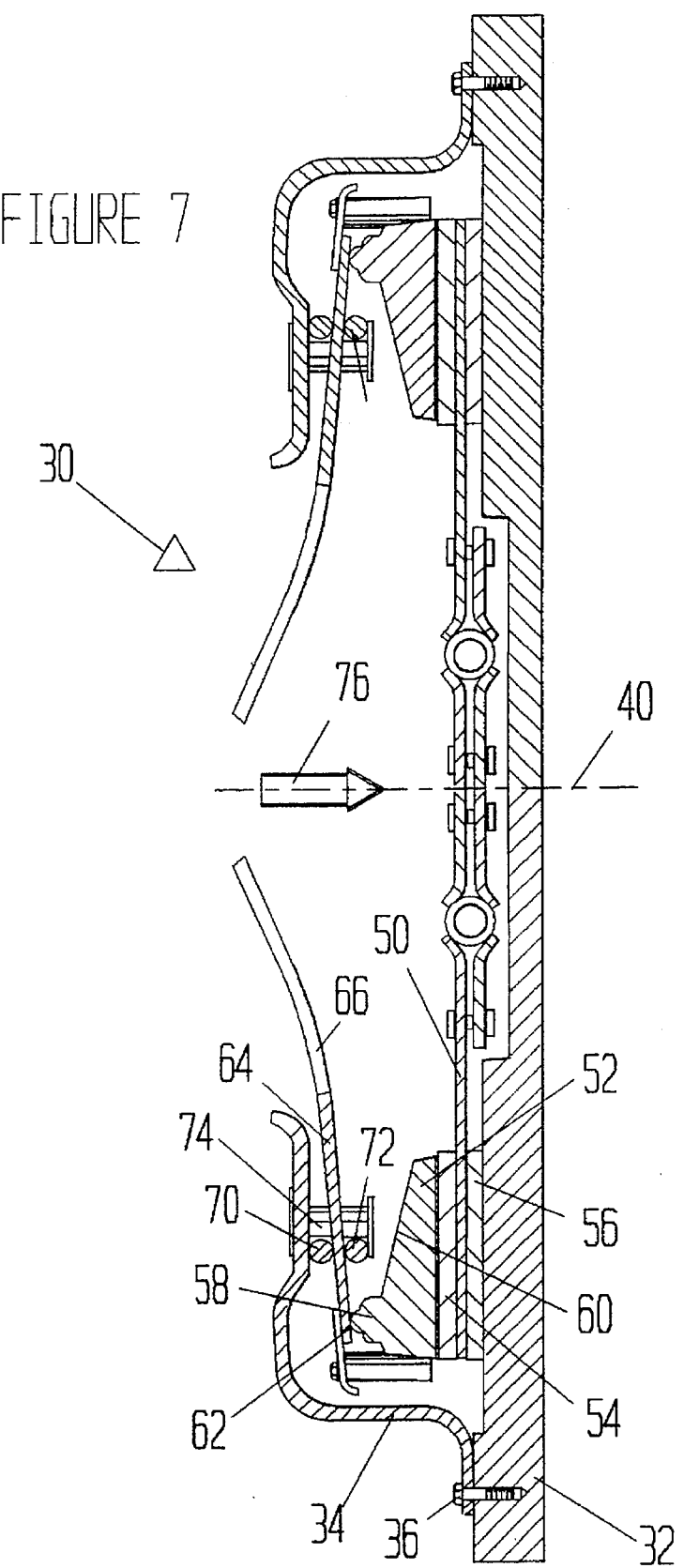

# AUTOMOTIVE CLUTCH WITH IMPROVED HEAT SHIELD

BACKGROUND OF THE INVENTION

1. Field of Invention

This invention relates to improvements in automotive clutches and, in particular, to an improved heat shield.

2. Brief Statement of the Prior Art

The typical automotive clutch has a clutch disk which is attached to the drive shaft and positioned between the flywheel and a pressure plate that is bolted to the flywheel. The pressure plate includes a pressure ring which is resiliently biased to frictionally capture the clutch disc between the pressure ring and the flywheel.

The earliest versions employed pressure rings formed of gray or ductile cast iron. However, the high mass and weight of cast iron creates unacceptable inertia, rendering cast iron pressure rings unsuitable for high speed engines and performance vehicles. This unsuitability has lead to the development of aluminum pressure rings.

Aluminum, however, loses structural strength at temperatures of about 435° F. and melts at about 1,200° F. Consequently, aluminum pressure plates need protection against the high frictional heat and peak temperatures generated in automotive clutches. Sliding of the clutch generates surprisingly large quantities of heat which must be dissipated without overheating the clutch components, or suffer the consequential warping or destruction of the pressure ring and other clutch plate components.

Aluminum pressure rings have been protected by plasma coatings of bronze or steel approximately 0.02 to 0.125 inch thick, or by attaching a steel ring (heat shield) to the frictional surface of the pressure ring.

These attempts have not been notably successful, particularly in performance vehicles where high engine speeds and considerable frictional heat is generated. In such applications, a delicate balance must be maintained between dissipation of the heat by transfer from the steel heat shield to the aluminum pressure ring without exceeding the useful operating temperature of the pressure ring and associated pressure plate components such as the clutch springs and the like.

OBJECTIVES OF THE INVENTION

It is an objective of this invention to provide an improved automotive clutch.

It is a further objective of this invention to provide a heat shield for an automotive clutch which protects the pressure ring from thermal degradation.

It is an additional objective of this invention to provide an automotive clutch with a heat shield that permits its use in high performance vehicles.

It is a further object of this invention to provide a heat shield with improved heat transfer characteristics ideally suited for heavy duty applications.

Other and related objectives will be apparent from the following description of the invention.

BRIEF STATEMENT OF THE INVENTION

This invention is an improved automotive clutch having an aluminum pressure ring with a heat shield that includes a thin outer metallic ring, preferably of steel, which is laminated to a layer of an adhesive resin that contains metallic elements which are in substantially direct heat exchange between the outer steel ring and the aluminum pressure ring. For this purpose, copper screen of suitable mesh, from 10 to about 20 U. S. Standard, is embedded in the adhesive resin layer, reinforcing the adhesive layer and providing a controlled degree of direct heat transmission from the steel ring to the aluminum ring. In preferred embodiments, the attachment of the steel ring to the pressure ring is enhanced by a plurality of countersunk, flush head fasteners which are spaced about the periphery of the ring in a regular geometric array. Optionally, a plurality of slots are provided in the steel ring to compensate for the differences in thermal expansion of the steel ring and the aluminum pressure ring.

BRIEF DESCRIPTION OF THE DRAWINGS

The invention will be described with references to the illustrations, of which:

FIG. 1 is a plan view of a pressure ring used in the invention;

FIG. 2 is a view along line 2—2' of FIG. 1;

FIG. 3 is an enlarged view of the area within arc 3—3' of FIG. 2;

FIG. 4 is an enlargement of the area within arc 4—4' of FIG. 3;

FIG. 7 is an elevational sectional view of a portion of an automotive clutch illustrating the pressure plate, flywheel and clutch disk.

DESCRIPTION OF THE PREFERRED EMBODIMENT

Figure 5:
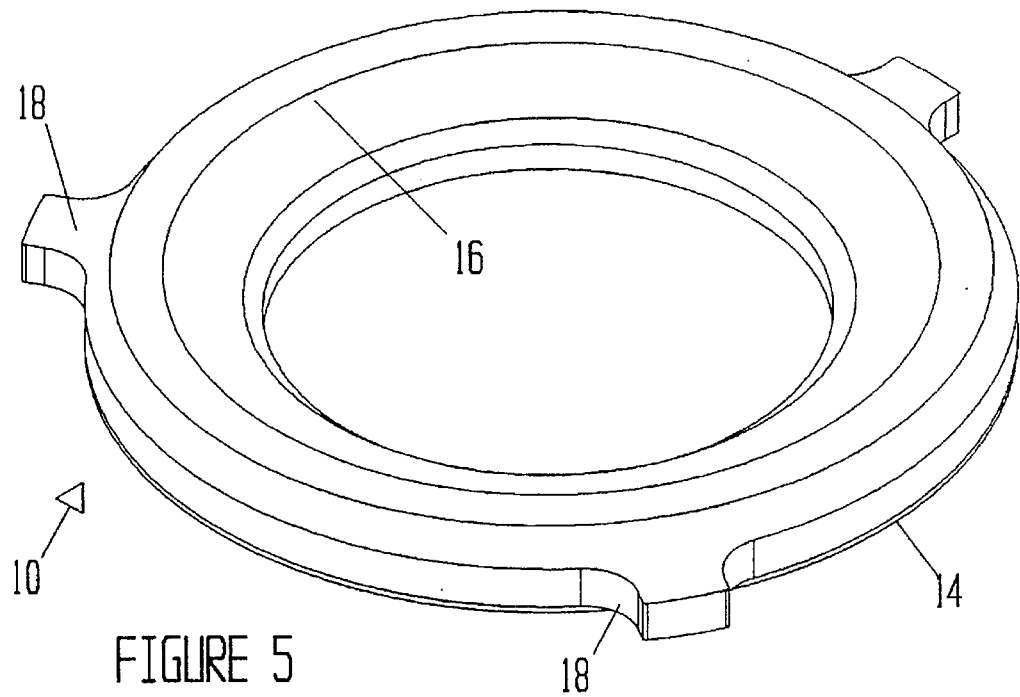
FIG. 5 is a perspective view of the pressure ring modified in the invention.

FIG. 1 illustrates a typical pressure ring 10 used in automotive clutches. The pressure ring 10 is an annular ring typically with an outer dimension of from 6 to about 12 inches, depending upon the particular application. To minimize weight and resultant centrifugal loading, the pressure plate is formed of a strong metal having a lesser weight than steel. Commonly, aluminum is used for this service, although other suitably strong light weight materials could be used. As shown in FIG. 2, the pressure ring 10 is a single piece monolithic casting having a flat, machined frictional face 12 which is covered by an outer ring 14, formed of high temperature strength metal, preferably steel, that serves as one of the heat shield elements of this invention. The pressure ring 10 typically has an upstanding circumferential rib 16 and a plurality of radial prongs 18, depending upon the particular clutch design. As previously mentioned, modern and high performance vehicle requirements have led to the use of cast aluminum for pressure rings to reduce the amount of inertia (rotating mass) of the clutch.

As shown in FIGS. 3 and 4, the heat shield of the invention comprises the outer steel ring 14 which is laminated to the machined face 12 of the pressure ring 10 by an adhesive layer 22 that is formed of a suitable high temperature resistant adhesive, e.g., epoxy or polyimide adhesives. Embedded in the adhesive layer 22 are a plurality of metallic elements 24 (see FIG. 4) which, in the preferred embodiment comprise a copper screen having a mesh from about 10 to 20, preferably about 16 U.S. Standard size. The copper screen has a wire thickness which corresponds to the thickness of the adhesive layer whereby the copper wire elements 24 of the screen are in near or complete direct contact with the outer steel ring 14 and the aluminum pressure ring 10. Selection of the particular screen size provides the clutch designer with a variable selection of wire thickness, thickness of the adhesive layer 22 as well as closeness of spacing, or density, of the metallic wire elements 24. The higher the density of the wire elements 24 and closeness of spacing, or in other words, the higher the mesh size, the greater density of metallic wire elements and the greater amount of heat that will be transferred from the steel ring 14 to the aluminum pressure ring 10. I have found that in a typical high performance application the use of 16 mesh U.S. Standard size copper screen is ideally optimum for longevity and reliability of the clutch.

Figure 6:
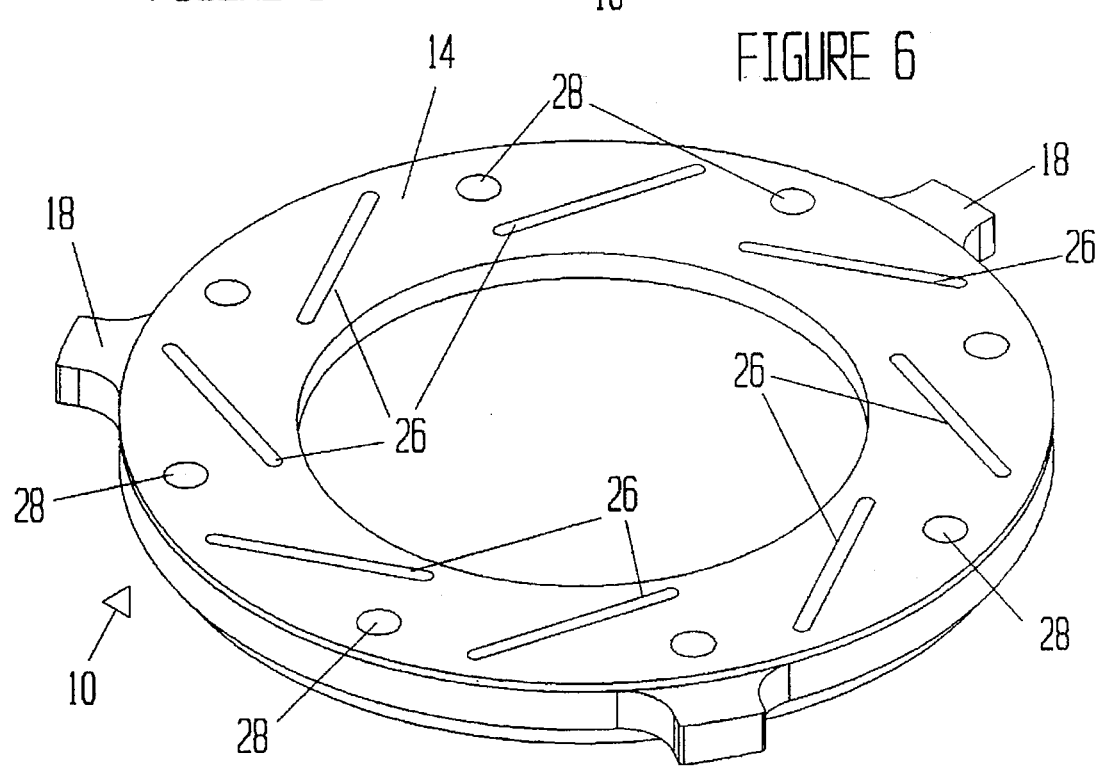
FIG. 6 is a perspective view of the frictional side of the pressure ring modified in the invention.

Referring now to FIGS. 5 and 6, the modified clutch pressure ring 10 of the invention is shown. As apparent from FIG. 6, the steel ring 14 is provided with a plurality of slots 26 which are aligned obliquely to the radials of the ring. These slots 26 extend entirely through the steel ring 14 and are located on a regular geometric array, preferably, in a circumferential array as illustrated, to provide compensation for the differences in thermal expansion of the steel ring 14 and of the aluminum pressure ring 10.

As shown in FIGS. 3 and 6, the outer steel ring 14 is also secured to the pressure ring 10 with a plurality of countersunk fasteners 28 which are typically socket head machine bolts having a head with sides tapered of approximately 60°. The fasteners 28 are also located about the surface of the pressure ring 10 in a regular geometric array, preferably in the circumferential array as illustrated. The number and spacing of these fasteners 28 provides the clutch designer with additional control over the mechanical attachment (shear strength) of the steel ring 14 to the pressure ring 10 and provides further capability in controlling direct heat transfer from the outer steel ring 14 to the aluminum pressure ring 10. The illustrated embodiment shows a plurality of eight fasteners 28 which have also been found ideally optimum in high performance and heavy duty clutch operations.

Referring to FIG. 7, there is illustrated a sectional view of a conventional automotive clutch 30 which has the pressure ring heat shield of this invention. The clutch plate assembly is mounted on a flywheel 32 with a clutch cover 34 that surrounds the assembly and which is fastened to the flywheel 32 by conventional machine screws 36. The clutch plate assembly is oriented on the center line 40 of the flywheel 32.

A clutch disc 50 is located between the flywheel 32 and the pressure ring 52. Frictional facings 54 and 56 are provided on opposite sides of the clutch disc 50 and engage surfaces on the flywheel 32 and the pressure ring 52.

The pressure ring 52 has a raised circular rim 58 on its upper surface 60 which provides a support for the base 62 of the diaphragm 64. The diaphragm 64 is a Bellville conical spring diaphragm which has a plurality of radial slots 66, forming a plurality of fingers. The diaphragm 64 has a fulcrum support 68 on the undersurface of the clutch housing cover 34 which is formed by a pair of rings 70 and 72 which are located above and below the diaphragm 64 and supported by a metallic fastener 74 that extends through the housing cover 34. The arrow 76 indicates the direction of the release force to disengage the clutch, hence the name "throw-in" clutch.

The invention will be further described with reference to the following examples which will demonstrate results and application of the invention:

EXAMPLE 1

An aluminum pressure plate, 10.5 inch diameter, was modified by application of the heat shield of the invention comprising an outer steel ring of 1010 CRS plate, 18 gage steel. The ring was provided with eight slots and eight countersunk fasteners in the circular patterns illustrated in FIG. 6. The steel ring was also laminated to the machined face of the aluminum pressure ring by an epoxy adhesive applied as a layer 0.011 inch thick in which was embedded a 16 mesh copper screen (having screen wire diameters of 0.011 inch.

The pressure ring was installed in an automotive clutch of a practice car with a Chevrolet 350 cubic inch engine and used on an oval track at a racing school.

After six months, the clutch had the following record of use: a total of 2699 laps with 302 starts from a pit road during class sessions, a total average top speed of 145 miles per hour, an average racing top speed of 150 mph, a rookie driver average top speed of 125 mph, an advanced driver average top speed of 160 mph, and a lifetime average top speed of 140 mph.

After six months, the motor was changed in the car, and the clutch was removed and the pressure ring was inspected. It was observed that the clutch was in good working order, and the heat shield and pressure ring were undamaged and suitable for continued use.

EXAMPLE 2

Another clutch was modified by applying a steel ring to the pressure plate as described in the preceding example. In this modification, however, the machine screw fasteners and the copper wire screen were omitted, so the steel ring was bonded to the machined face of the pressure ring with an epoxy adhesive layer of 0.011 inch thickness.

The clutch was installed in a racing car of the same description as in Example 1. After six months, the clutch had the following record of use: a total of 2608 laps with 285 starts from a pit road during class sessions, with substantially the same total average top speed, average racing top speed, rookie driver average top speed, advanced driver average top speed, and lifetime average top speed as set out in Example 1.

After six months, the motor was changed in the car, and the clutch was removed and the pressure ring was inspected. It was observed that the heat shield had failed, as the steel facing was no longer bonded to the pressure plate.

The invention has been described with reference to the illustrated and presently preferred embodiment. It is not intended that the invention be unduly limited by this disclosure of the presently preferred embodiment. Instead, it is intended that the invention be defined, by the means, and their obvious equivalents, set forth in the following claims:

What is claimed is:

1. A pressure ring for an automotive clutch which comprises an annular metallic ring having a planar bearing surface which is covered with a heat shield comprising a lamination of an outer steel annular ring and a bonding layer of a thermosetting adhesive and embedded metallic elements having thicknesses substantially equal to the thickness of said bonding layer, whereby said metallic elements function as thermosetting-adhesive reinforcement and as thermal conductors to transfer heat from said steel annular ring to said pressure ring.

2. The pressure ring of claim 1 wherein said metallic elements comprise a copper wire screen having a screen size from 10 to about 20 mesh, U.S. standard.

3. The pressure ring of claim 2 wherein said copper wire screen has a screen size of about 16 mesh, U.S. standard.

4. The pressure ring of claim 1 wherein said thermosetting adhesive is an epoxy resin.

5. The pressure ring of claim 1 wherein said steel annular ring has a thickness of 0.067 to 0.25 inch.

6. The pressure ring of claim 5 wherein said steel annular ring has a thickness of about 0.1 inch.

7. The pressure ring of claim 1 wherein the thickness of said bonding layer is from 0.04 to 0.15 inch.

8. The pressure ring of claim 7 wherein the thickness of said bonding layer is about 0.1 inch.

9. The pressure ring of claim 1 including a plurality of screw fasteners disposed in a geometric array across the face of said annular ring and countersunk in said heat shield and flush with the outer surface of said steel annular ring.

10. The pressure ring of claim 9 wherein said screw fasteners are disposed in a circumferential array.

11. The pressure ring of claim 1 including a plurality of surface grooves disposed in a geometric array in the outer surface of said steel annular ring.

12. The pressure ring of claim 11 wherein said surface grooves are disposed in a circumferential array lying along oblique, non-radial directions.

13. In an automotive clutch wherein a clutch disc is carried on a drive shaft and supports an annular frictional surfaced member between a pressure ring and a flywheel, and including means to apply a compressive clamp load to clamp said disc between said ring and flywheel; the improvement thereof which comprises a heat shield permanently affixed to the bearing surface of said pressure ring which comprises:

a lamination of an outer steel annular ring and a bonding layer of a thermosetting adhesive and embedded metallic elements having thicknesses substantially equal to the thickness of said bonding layer, whereby said metallic elements function as thermosetting-adhesive reinforcement and as thermal conductors to transfer heat from said steel annular ring to said pressure ring.

14. The automotive clutch improvement of claim 13 wherein said metallic elements comprise a copper wire screen having a screen size from 10 to about 20 mesh, U.S. standard.

15. The automotive clutch improvement of claim 14 wherein said copper wire screen has a screen size of about 16 mesh, U.S. standard.

16. The automotive clutch improvement of claim 13 wherein said thermosetting adhesive is an epoxy resin.

17. The automotive clutch improvement of claim 13 wherein said steel annular ring has a thickness of 0.067 to 0.25 inch.

18. The automotive clutch improvement of claim 17 wherein said steel annular ring has a thickness of about 0.1 inch.

19. The automotive clutch improvement of claim 13 wherein the thickness of said bonding layer is from 0.04 to 0.15 inch.

20. The automotive clutch improvement of claim 19 wherein the thickness of said bonding layer is about 0.1 inch.

21. The automotive clutch improvement of claim 13 including a plurality of screw fasteners disposed in a geometric array across the face of said annular ring and countersunk in said heat shield and flush with the outer surface of said steel annular ring.

22. The automotive clutch improvement of claim 21 wherein said screw fasteners are disposed in a circumferential array.

23. The automotive clutch improvement of claim 13 including a plurality of surface grooves disposed in a geometric array in the outer surface of said steel annular ring.

24. The automotive clutch improvement of claim 23 wherein said surface grooves are disposed in a circumferential array lying along oblique, non-radial directions.

* * * * *